United States Patent [19]

Bühr et al.

[11] Patent Number: 5,553,890
[45] Date of Patent: Sep. 10, 1996

[54] PRETENSIONER FOR A SAFETY BELT DRIVE

[75] Inventors: Erwin Bühr, Schwäbisch Gmünd; Volker Holzapfel, St. Wendel; Jürgen Petzi, Geislingen-Eybach; Klaus Böhmler, Schwäbisch Gmünd, all of Germany

[73] Assignee: TRW Repa GmbH, Alfdorf, Germany

[21] Appl. No.: 387,282

[22] Filed: Feb. 10, 1995

[30] Foreign Application Priority Data

Feb. 11, 1994 [DE] Germany .......................... 44 04 462.3

[51] Int. Cl.⁶ .................................................. B60R 22/46
[52] U.S. Cl. ........................ 280/806; 242/374; 60/632
[58] Field of Search ........................... 280/806; 242/374; 60/632, 635, 636, 638; 297/480

[56] References Cited

U.S. PATENT DOCUMENTS

| | | | |
|---|---|---|---|
| 3,386,683 | 6/1968 | Howland | 242/374 |
| 4,008,780 | 2/1977 | Bendler et al. | 280/806 |
| 4,237,690 | 12/1980 | Tsuge et al. | 280/806 |
| 4,434,953 | 3/1984 | Gemar et al. | 242/374 |
| 4,508,287 | 4/1985 | Nilsson | 280/806 |
| 4,558,832 | 12/1985 | Nilsson | 280/806 |
| 5,443,222 | 8/1995 | Modinger et al. | 242/374 |
| 5,492,368 | 2/1996 | Pywell et al. | 280/806 |

FOREIGN PATENT DOCUMENTS

| | | |
|---|---|---|
| 0629531 | 12/1994 | European Pat. Off. . |
| 2349891 | 4/1975 | Germany . |
| 3231509 | 3/1984 | Germany .................. 242/374 |
| 9308273 | 9/1993 | Germany . |
| 4234276 | 11/1993 | Germany . |

Primary Examiner—Eric D. Culbreth
Assistant Examiner—Peter C. English
Attorney, Agent, or Firm—Tarolli, Sundheim, Covell, Tummino & Szabo

[57] ABSTRACT

A belt pretensioner for a safety belt comprises a pyrotechnic propellant charge (34) able to be operated by a fuze (48) and adapted to act on a drive device for a belt pretensioner. The drive device comprises a piston (18), adapted to be moved in translation, of a piston and cylinder unit. The pyrotechnic propellant charge (34) is mounted within the extent of a cylinder space (28) enclosed by the piston and cylinder unit. The fuze (48) is designed in the form of a self-contained unit and arranged separately from the propellant charge (34).

5 Claims, 3 Drawing Sheets

PRETENSIONER FOR A SAFETY BELT DRIVE

BACKGROUND OF THE INVENTION

The present invention relates to a safety belt pretensioner drive comprising a piston and cylinder unit with a piston adapted to be moved in translation.

In known belt pretensioner drives the propellant charge is enclosed jointly with the fuze in a tubular container, which is termed a gas generator cartridge. The gas generator cartridge sticks out from the side of the cylinder of the drive device and increases the amount of space required for the accommodation in the vehicle. Owing to the required deflection of the gas flow the utilization of the pyrotechnic propellant is not optimum. During shipping and storage, handling and fitting of the gas generator cartridge complex safety measures must be taken in order to prevent accidental triggering by the fuze fitted owing to a blow or electrostatic charging.

SUMMARY OF THE INVENTION

An object of the present invention is to provide a belt pretensioner drive which is simple in structure, compact and able to be produced at a low cost and furthermore is simple and reliable as regards production and fitting.

According to the invention, a safety belt pretensioner drive is provided which comprises a cylinder and a hollow piston slidably accommodated in said cylinder, said hollow piston defining an internal cylindrical space and a pyrotechnical charge being filled into said space. In this embodiment of the drive, a separate container is not required, reducing costs and space requirements.

According to another aspect of the invention, a safety belt pretensioner drive is provided which comprises a cylinder and a piston slidably accommodated in the cylinder, the cylinder having a bottom wall spaced from the piston, defining a cylindrical chamber between the piston and the bottom wall, and a pyrotechnical charge being fitted into the chamber adjacent the bottom wall.

For the arrangement of the propellant charge within the cylinder the latter only has to be slightly larger in size than in the case of conventional designs. The slim constructional form of the piston and cylinder drive unit is not interfered with by any laterally projecting parts. A separate gas generator housing is now unnecessary so that the amount of material, the weight and the amount of assembly work is substantially reduced. Securing the propellant charge in place in the interior of cylinder may be achieved using parts present in any case, and more particularly by the cylinder tube itself and by the piston arranged therein. Lastly, losses which would otherwise be due to deflection of the gas flow no longer occur, since the pressure produced by the propellant charge is developed in the axial direction of the cylinder.

Owing to the separation of the cylinder from the propellant charge an enhanced degree of safety during shipping, storage and on fitting of the components of the belt retractor is ensured, since the fuze may be installed last after the manufacture of the belt pretensioner. Furthermore, a separate tube container is no longer required for the propellant charge and the fuze.

In accordance with a further advantageous embodiment the propellant charge is provided within a propellant charge receiving space, which is shut off by a partition wall on the side adjacent to the fuze. This partition wall is preferably constituted by a blow-out patch. In the case of this arrangement it is possible for the fuze to blow out the wall in a particularly simple fashion and to prime the propellant charge.

A particularly simple and also compact design of the belt pretensioner results if the space accommodating the propellant charge is formed within the piston and the partition wall constitutes at least a part of the piston crown adjacent to the cylinder space. This arrangement is more especially advantageous when the drive device comprises a rack connected with the piston and extending axially away from the cylinder space. In the case of this embodiment of the invention the piston which is connected with the rack and is preferably made integrally with it simultaneously serves as a means receiving the propellant charge so that no additional propellant container is required. Furthermore, in this manner it is possible for the recoil acting on the piston when propellant charge ignites to be additionally utilized for providing the drive.

An other advantageous feature of the invention is such that the propellant charge receiving space is provided in a propellant container, which is arranged within the cylinder space. This design renders it possible to prefabricate the container with the propellant charge but without the fuze so that for the fitting of the belt pretensioner the prefabricated propellant charge container merely has to be inserted into the cylinder space. The propellant container is in the case of this embodiment of the invention preferably arranged on the terminal wall, which is opposite to the piston, of the cylinder, is shut off from the cylinder space by a cover and possesses a blow-out patch facing the fuze. This arrangement renders it possible to arrange the fuze on one side of the propellant container, which is different the output opening which is shut off by the cover for the propellant gases.

If the propellant container is provided with at least one projection extending in the axial direction of the cylinder, such projection may serve to provide a reduction in the volume of the cylinder space so that a graduated or stepped characteristic of the piston and cylinder unit is ensured which leads to a graduated expansion characteristic of the piston and cylinder unit.

In this respect the free end of the projection preferably constitutes an abutment for the piston so that the cylinder space possesses a defined dead volume, when the piston contacts the abutment and the piston has a reduced end area subjected to the action of the pressure at the start of its movement.

If the drive device has a traction element, more particularly in the form of a cable, connected with the piston, which extends axially through the cylinder space and emerges through the end wall of the cylinder in a sealed manner and if the projection is designed in the form of a tubular part surrounding the traction element, then the projection will serve as a protection for the traction element, for instance in the form of a cable, during the combustion of the propellant charge. In this respect the projection surrounding the traction element may simultaneously serve as a seal for the traction element.

In another embodiment the fuze is provided adjacent to the end cylinder wall, which is opposite to the piston crown.

If the end wall of the cylinder has a fuze accommodating space provided therein which is connected via an ignition or touch channel with the cylinder space, it is possible on the one hand for the ignition flame from the fuze to be directed in the desired fashion onto the gas propellant charge by having a suitable alignment of the fuze channel and on the other hand for the fuze to be simply fitted, more particularly in cases wherein the fuze accommodating space is accessible from the outside.

Further advantageous developments and convenient forms of the invention will be understood from the following detailed descriptive disclosure of several embodiments thereof in conjunction with the accompanying drawings referred to.

DESCRIPTION OF THE PREFERRED EMBODIMENTS

Figure 1:
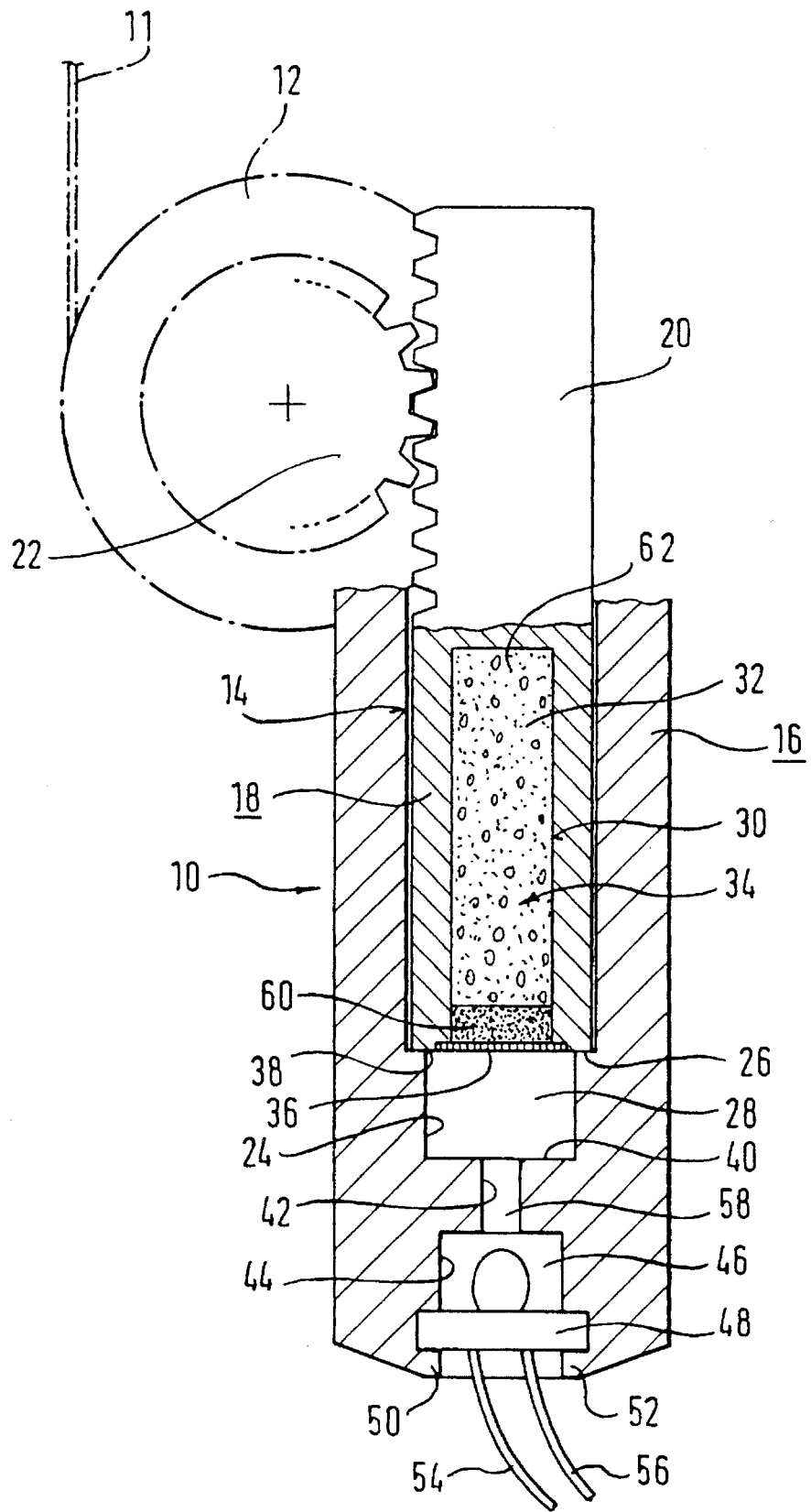
FIG. 1 shows a partly sectioned lateral elevation of a first embodiment of the invention.

In FIG. 1 the reader will see a belt pretensioner for a safety belt 11, only illustrated diagrammatically, with a belt retractor 12. The belt pretensioner comprises a housing 10, which is connected with the belt retractor 12.

The housing 10 possesses a stepped axial hole with a first hole section 14 of large diameter. In the housing 10 the hole section 14 constitutes a cylinder 16 of a piston and cylinder unit. Within the hole 14 a piston 18 is arranged for reciprocating sliding motion. The piston 18 merges with a rack 20 at its end extending out of the cylinder 16 and therefore out of the housing 10. The rack 20 meshes with a suitably adapted pinion 22 of the belt pretensioner able to be coupled with the belt drum of the belt retractor 12 by a coupling mechanism.

The first hole section 14 merges at its inner end, which is remote from the opening, with a second hole section 24 with the formation of an essentially radial annular surface 26. The annular surface 26 or shoulder constitutes an abutment for the piston 18 so that the cylinder 16 and the piston 18 define a cylinder space 28 inside the second hole section 24. The cylinder space 28 possesses a volume which is dependent on the axial extent and diameter of the second hole section.

The piston 18 is provided with an axial hole 30, which constitutes a space 32 for the accommodation of a propellant charge 34.

The axial hole 30, which is a blind hole, opens into the cylinder space 28. At such opening the axial hole 30 is shut off by means of a cover, which constitutes a partition wall 36 between the propellant charge 34 and the cylinder space 28, such cover constituting a part of the piston crown 38 which is nearest to the cylinder space 28.

In the end wall 40, which is opposite to the piston crown 38, of the cylinder 16 a third section 42 of the axial hole is provided having a small diameter and which at its end remote from the cylinder space 28 merges into a fourth hole section 44 with a larger diameter. The fourth hole section opens at the other axial end of the housing 10 where it constitutes fuze accommodating space 46. In the fuze accommodating space 46 a fuze 48 is press fitted. The fuze 48 is additionally locked in position by two spurs 50 and 52, which owing to bending over a part of the edge of the opening of the fourth hole section 44 additionally clamp the fuze 48 in place. The fuze 48 connected by two electrical cables 54 and 56 with a power supply operated by a trigger control.

If the fuze 48 is fired or ignited by the application of a firing pulse to the electrical cables 54 and 56, a flame will be produced in the fuze accommodating space 46 and such flame will be propagated through the third hole section 42, which forms a firing channel 58, into the cylinder space 28 where it will impinge on the partition wall 36 designed in the form of a blow-out patch and puncture the same. Thereafter the flame will ignite a first propellant charge portion 60, which is arranged in the interior of the axial hole 30 in the piston 18 directly behind the partition wall 36, and forms a booster. This booster will then provide an explosion-like ignition of the propellant 62 forming a second propellant portion. The gases of combustion produced on combustion of the propellant charge 34 will pass through the burst partition wall 36 into the cylinder space 28 where they will build up a high gas pressure, which is resisted at the one end by the fuze 48 held by the press fit and additionally locked by the projections 50 and 52. This gas pressure ensures that the piston 18 will be pushed with a high acceleration inside the first hole section 14 toward the opening of the first hole section 14. When this happens the rack 20 will rotate the pinion 22. Such rotation will be transmitted by the coupling mechanism in the winding up direction to the belt drum of the belt retractor 12 so that the safety belt 11 will be drawn taut.

Figure 2:
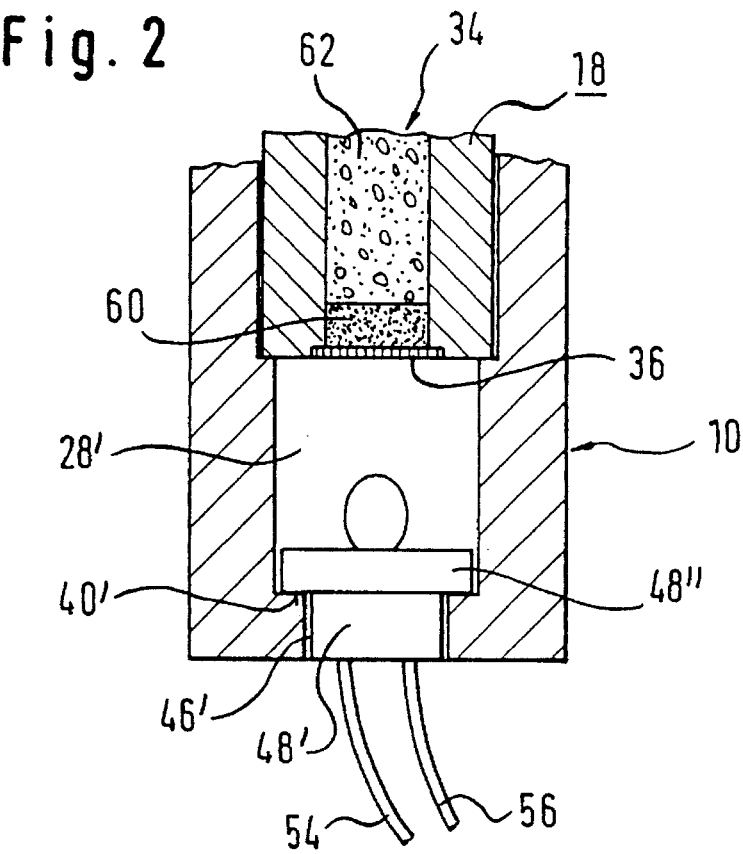
FIG. 2 is a sectioned view of part of a modification of the embodiment in accordance with FIG. 1.

While in the embodiment of FIG. 1 the fuze is inserted from the outside into the fourth section 44 of the axial hole in the housing 10 and is then secured in position by crimping over the spurs 50 and 52, in the modified embodiment illustrated in FIG. 2 the fuze 48' is inserted from the inside, that is to say from the end with the cylinder space 28' into the fuze accommodating space 46'. The cylinder space 28' is in this case directly joined with the fuze accommodating space, that is to say without the formation of a touch channel. The fuze 48' is provided with a radially projecting peripheral collar 48" which bears against the end wall 40' of the cylinder space 28'.

Figure 3A:
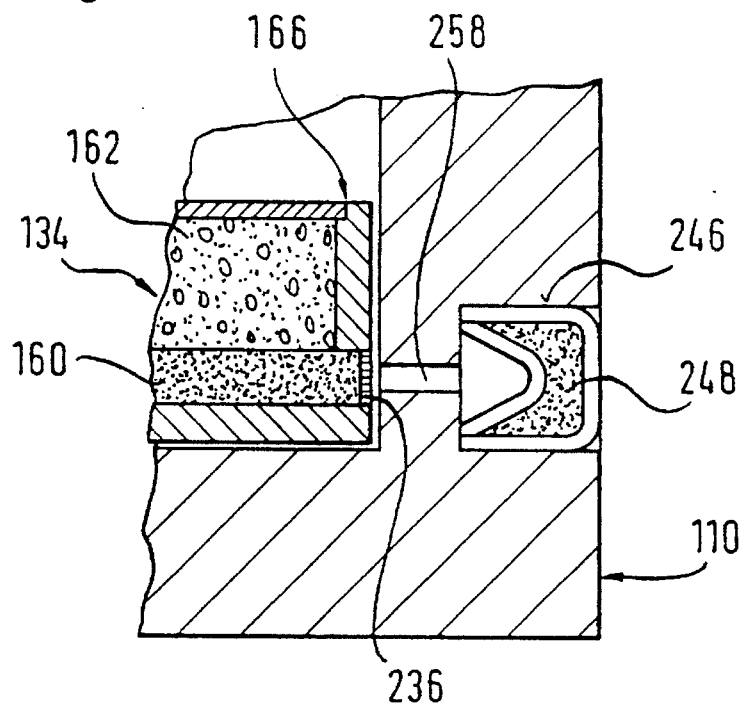
FIG. 3a shows a possible modification of the design of FIG. 3.
Figure 3:
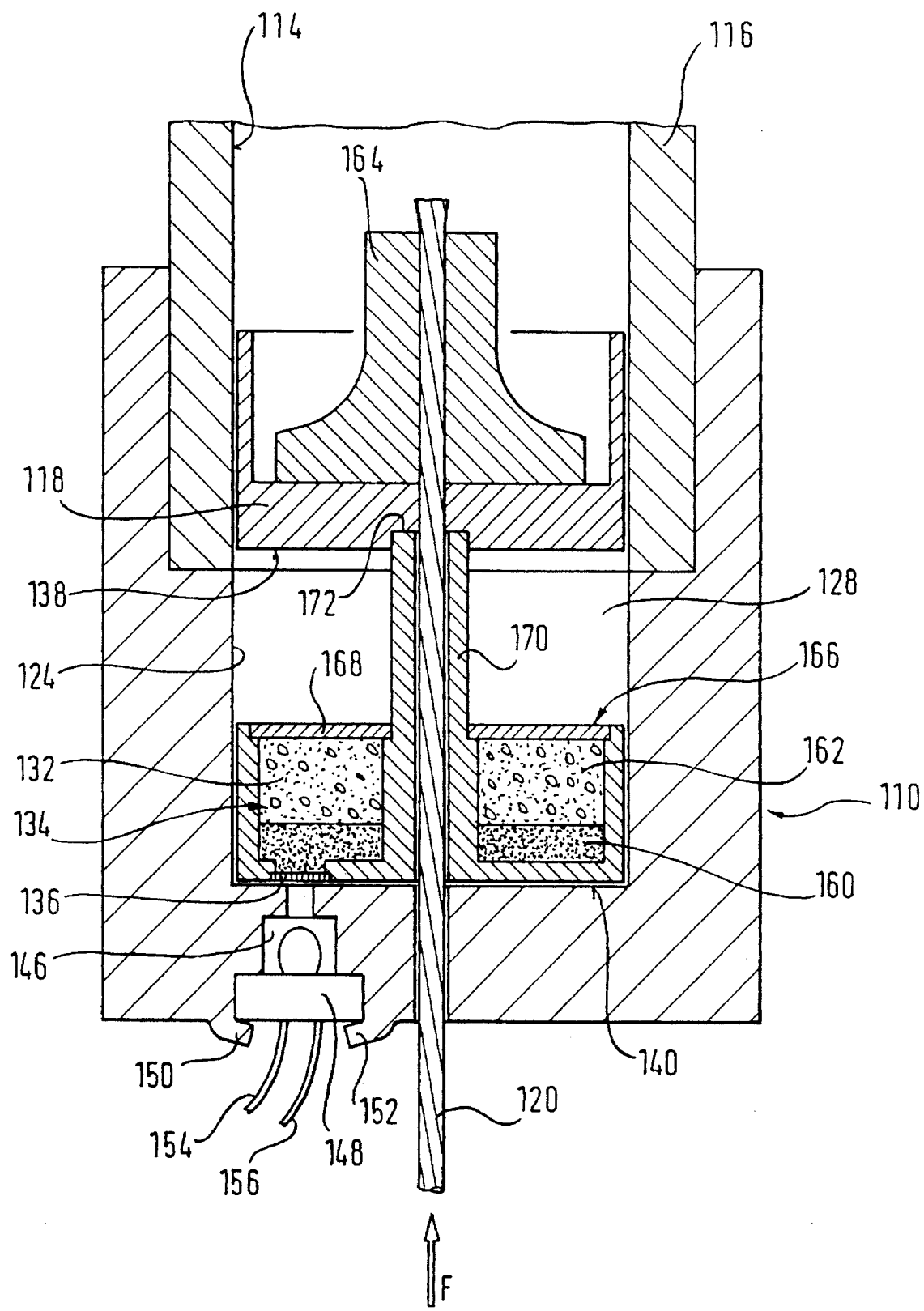
FIG. 3 is a sectioned view of part of a second embodiment of the invention.

An other embodiment of the invention is depicted in FIG. 3. Here elements similar in function are denoted by reference numerals increased by 100. The cylinder 116 is in this embodiment largely constituted by a tube inserted into the housing 110. The first hole section 114, in which the piston runs, is in this case formed in the cylinder 116 and merges still with essentially the same diameter with the second hole section 124 defining the cylinder space 128.

The drive device for the belt pretensioner is in this case constituted in a known fashion by a cable functioning as a traction element 120 and which extends axially through the cylinder space 128 and emerges through a seal in the end wall 140 of the housing 110. The traction element 120 extends axially through the piston 118 and is attached on a cable attachment element 164, which is provided on the back side or end of the piston 115 remote from the cylinder space 128 and bears against the rear end of the piston 118 and substantially evenly distributes the tension exerted by the traction element 120 to the surface of the piston 118.

Within the cylinder space 128 a propellant container 166 is arranged coaxially and surrounds the traction element 120 like a ring and extends in the radial direction as far as the inner bore surface of the second hole section 124 surrounding the cylinder space 128. In the propellant container 166 an annular propellant charge receiving space 132 is formed, in which a booster 160 and a propellant charge 112 are provided. At its annular opening directed toward the cylinder space 128 the propellant charge receiving space 132 is shut off by an annular cover 168. In its inner part surrounding the traction element 120 the propellant charge container 166 is surrounded by an annular projection 170 encircling the traction element 120, such projection 170 constituting an abutment 172 for the piston 118 at its free end. It is in this manner that the annular projection 170 serves to provide the axial clearance between the cover 168 and the propellant charge container 166 and the piston crown required for the formation of the cylinder space 128.

The propellant charge 134 is fired or ignited by a fuze 148, which is arranged in a manner similar to that in the first embodiment but which is installed in a fuze accommodating space 164 constituted by a stepped hole which is eccentric in relation to the cylinder axis, such space 146 communicating via a touch channel 158 with the cylinder space 128. Adjacent to the opening of the touch channel 158 into the cylinder space 128 the propellant charge container 166, in engagement with the end wall 60, is provided with a blow-out patch 136, adapted to be burst open by the fuze 148, the flame from the fuze igniting firstly the booster 160 and then the propellant charge 162. The pressure developed on firing of the propellant charge consisting of the booster 160 and the propellant charge 162 within the propellant charge station 132 will blow off the annular cover 168 out of the opening of the propellant charge accommodating space 132 so that the gases evolved during combustion of the propellant charge 134 will be able to escape into the cylinder space 128 and will serve to propel the piston 118 in the same fashion as in the first working embodiment. However in the embodiment of FIG. 3 the piston 180 will draw the traction element 120 into the cylinder space 128 and the tension exerted on the cable in the direction of the arrow F will be transmitted directly or via a pulley, able to be coupled with the belt drum of the belt retractor, for drawing the safety belt taut.

On the right hand side of the housing 110 in the embodiment depicted in FIG. 3a an alternative arrangement of a fuze 248 will be seen, which is in the form of a percussion fuze. The fuze 284 is held by a press fit in a radial hole in the housing 110. The radial hole constituting the fuze accommodating space 246 is in communication with the cylinder space 128 via a touch channel or hole 258 extending radially in relation to the piston and cylinder unit. The opening of the touch channel 258 into the cylinder space 128 is directly adjacent to a blow-out patch 236 provided in the peripheral wall of the propellant charge container 166 and acting as a partition wall between the propellant charge 134 and the surroundings of the propellant charge container 166. A mechanical blow exerted on the fuze 248 by a conventional percussion device will lead to ignition of the fuze 246. The flame from the fuze will pass through the touch channel 258, burst the blow-out patch 236 and ignite the propellant charge 134. The following reactions will be the same as with the events initially described in connection with operation of the electrical fuze 148.

The annular projection 170, encircling the traction element 120 of the propellant charge container 166 serves not only as a spacer for the piston 118 but also protects the traction element 120 against the action of heat during combustion of the propellant charge. By a suitable selection of the radial extent of the projection 170 it is furthermore possible to produce the effect of a stepped piston, since when the piston 118 comes clear of the abutment 172 of the projection 170 there will be a sudden increase in the volume defined by the cylinder. Furthermore the projection 170 may —at least in the initial period of pressure build-up in the interior of cylinder space 128—seal off the passage through the end wall 140 for the cable, at least until the piston has slid a predetermined distance (the distance by which the projection 170 extends axially into the piston 118).

The propellant charge 134 may also consist of two propellants with different combustion rates instead of consisting of the booster 160 and the propellant 162. The propellant charge container 166 may consist either of plastic or of a light weight metal as for instance aluminum.

The fitting of the fuze is performed in the embodiment illustrated in FIGS. 1, 3 and 3a as one of the last steps after the assembly of the belt retractor, the fuze being inserted from the outside. The fuze may however also, as depicted in the case of the modification of FIG. 2, be fitted before the installation of the propellant charge container. This means that disarming of the fuze is unnecessary.

What is claimed is:

1. A safety belt pretensioner drive comprising a cylinder and a hollow piston slidably accommodated in said cylinder, said hollow piston defining an internal cylindrical space, a pyrotechnical charge being filled into said space, said cylinder having a bottom wall spaced from said piston, a cylindrical chamber defined between said bottom wall and said piston, said bottom wall having a through opening and a fuse being seated in said through opening axially spaced from said pyrotechnical charge.

2. The safety belt pretensioner drive of claim 1, wherein said through opening is formed by a channel extending in an axial direction of said cylinder.

3. The safety belt pretensioner drive of claim 1, wherein said through opening is formed by a stepped bore extending in an axial direction of said cylinder.

4. The safety belt pretensioner drive of claim 1, wherein said piston is integrally formed with a rack member for engagement of a pinion.

5. The safety belt pretensioner drive of claim 1, wherein a firing channel is provided within said bottom wall between said cylindrical chamber and said fuse.

* * * * *